United States Patent Office 2,925,350
Patented Feb. 16, 1960

2,925,350
COMPOSITION FOR STOPPING LEAKS IN PIPES AND PLUMBING FITTINGS

Glen F. Moore, San Diego, Calif.

No Drawing. Application November 6, 1958
Serial No. 772,168

1 Claim. (Cl. 106—33)

This invention relates to a mixture which may be used as a sealer for holes and cracks which may exist in certain plumbing which is not subjected to high pressures, such as vent pipes and joints and drainage pipe and connections.

An object of my invention is to provide an effective substance containing safe, inexpensive ingredients which are readily obtainable on the open market.

A further object is to provide such a substance which is easily and inexpensively manufactured.

A still further object is to provide such sealing compound which easily sets even in contact with water and which functions permanently regardless of temperature changes.

Beeswax is now used predominately in the art; as distinguished therefrom my novel concoction will not melt in hot weather and thusly will remain effective at all times. I find the most satisfactory ingredients and the proportions thereof by volume to be as follows:

| | Parts |
|---|---|
| Beeswax | 10 |
| Paraffin | 1 |
| Dry cement | 11 |
| Casting plaster (20 min. setting) | 11 |
| Lampblack | 2½ |

It is to be understood that the foregoing ingredients and proportions of each set opposite thereto are what I have found to be optimum and that the invention and discovery include immaterial variances thereof.

The following steps are found to be best for preparing the mixture: First melt a desired quantity of beeswax, maintain the melted beeswax at approximately 300 deg. F.; separately therefrom melt the indicated quantity of paraffin; mix these two melted substances slowly and with constant stirring. Next, to the indicated amount of fine, sifted Portland cement dry mix the indicated amounts of casting plaster and lampblack. This dry mixture of all three substances should be without lumps and of a fine grade. After thoroughly mixing, the dry mix is slowly added to said melted mix, being carefully to constantly stir (not beat) the liquid and to maintain the 300 degree temperature. It is very important to constantly stir the substances throughout the entire process.

When all substances are thusly mixed together, the temperature thereof is allowed to drop to approximately 235 degrees F. at which point the solids will not settle out and the mixture is fluid enough to pour into desired forms where it is cooled to room temperature, ready for handling as a solid.

The composition is used to stop leaks in low pressure plumbing. It is applied by direct application of heat in customary manner and direct contact with the leaky portion of the vent, soil or drain pipe or fitting or the like.

Although preferred embodiments of the composition are described it is to be understood that further modifications and changes may be resorted to which will fall within the scope of the invention or discovery as claimed.

What is claimed is:

A composition for stopping leaks in pipes and plumbing fittings consisting of, by volume, beeswax 10 parts; paraffin 1 part; Portland cement 11 parts; casting plaster 11 parts; lampblack 2½ parts.

References Cited in the file of this patent

UNITED STATES PATENTS

| 1,607,405 | Lukens | Nov. 16, 1926 |
| 2,198,776 | King et al. | Apr. 30, 1940 |
| 2,321,522 | Sands | June 8, 1943 |

FOREIGN PATENTS

| 123,695 | Great Britain | Mar. 6, 1919 |